(12) United States Patent
Kawakubo et al.

(10) Patent No.: US 7,055,383 B2
(45) Date of Patent: Jun. 6, 2006

(54) GEAR POSITION DETECTION SYSTEM FOR A TRANSMISSION

(75) Inventors: Hiroyuki Kawakubo, Saitama (JP); Toru Gunji, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 44 days.

(21) Appl. No.: 10/737,698

(22) Filed: Dec. 16, 2003

(65) Prior Publication Data
US 2004/0139795 A1 Jul. 22, 2004

(30) Foreign Application Priority Data
Dec. 26, 2002 (JP) ............................ 2002-377042

(51) Int. Cl.
*G01C 21/00* (2006.01)
(52) U.S. Cl. ....................................... 73/181
(58) Field of Classification Search ................. 73/112; 409/7; 180/336, 233, 65.2, 65.6; 74/409, 74/745, 331, 335, 337.5
See application file for complete search history.

(56) References Cited

U.S. PATENT DOCUMENTS

| | | | |
|---|---|---|---|
| 4,660,430 A * | 4/1987 | Bortfeld et al. ............... 74/335 |
| 4,719,819 A * | 1/1988 | Tsutsumikoshi et al. ...... 74/745 |
| 5,395,293 A | 3/1995 | Matsuura et al. |
| 6,085,607 A | 7/2000 | Narita et al. |
| 6,220,109 B1 * | 4/2001 | Fischer et al. ............. 74/337.5 |
| 6,357,545 B1 * | 3/2002 | Hori et al. ................... 180/219 |
| 6,443,275 B1 | 9/2002 | Hori et al. |
| 6,453,762 B1 * | 9/2002 | Nishikawa et al. ........... 74/335 |
| 6,502,652 B1 * | 1/2003 | Rogg ......................... 180/65.2 |
| 6,619,450 B1 * | 9/2003 | Ota et al. ................... 192/3.56 |
| 6,832,590 B1 * | 12/2004 | Hattori et al. .......... 123/195 R |
| 6,857,499 B1 * | 2/2005 | Kawamoto et al. ......... 180/336 |

FOREIGN PATENT DOCUMENTS

| | | |
|---|---|---|
| EP | 0 911 253 A | 4/1999 |
| JP | 58-121339 | 7/1983 |
| JP | 2000-145956 | 5/2000 |

* cited by examiner

*Primary Examiner*—Eric S. McCall
*Assistant Examiner*—Octavia Davis
(74) *Attorney, Agent, or Firm*—Carrier, Blackman & Associates, P.C.; William D. Blackman; Joseph P. Carrier (57) ABSTRACT

A gear position detecting system includes structure which facilitates mounting of the system, and minimizes direct contact of other objects with the system. The outer circumferential surface of a shift drum, turned by operation of a change pedal, is provided with lead grooves. Shift forks, engaged with the lead grooves, are moved in the left-right direction by turning of the shift drum, whereby shift gears are changed over, and a speed change desired by the rider is performed. A detection pin of a neutral safety switch, which is one of gear position sensors, is pushed in by a detection cam of a cam surface provided at the outer circumferential surface of the shift drum in the speed change operation position, whereby a neutral position is detected.

15 Claims, 7 Drawing Sheets

GEAR POSITION DETECTION SYSTEM FOR A TRANSMISSION

CROSS-REFERENCE TO RELATED APPLICATIONS

The present application claims priority under 35 USC 119 based on Japanese patent application No. 2002-377042, filed Dec. 26, 2002.

BACKGROUND OF THE INVENTION

1. Field of the Invention

The present invention relates to a gear position detection system for a transmission. More particularly, the present invention relates to a gear position detection system which detects gear position, displays such information to the rider, and is protectively mounted in a manner that substantially shields a sensor from damage during operation.

2. Description of the Background Art

A conventional gear position sensor, on a foot-operated type transmission of a motorcycle or motor tricycle, is mounted on the outside of a transmission case side wall, at a shift drum shaft support portion thereof. A detection pin of the sensor penetrates through the side wall of the transmission case, so as to have its tip end contact a cam surface on an end face of the shift drum.

In the described conventional system, the mounting position of the gear position sensor is at a rear lower portion of a clutch, and in a depression defined between a projected portion of the transmission case, surrounding the clutch, and a vehicle body frame (see, for example, the disclosure of Japanese Patent Publication No. Sho 62-13537 (page 2, FIGS. 1 to 2)).

Figure 10:
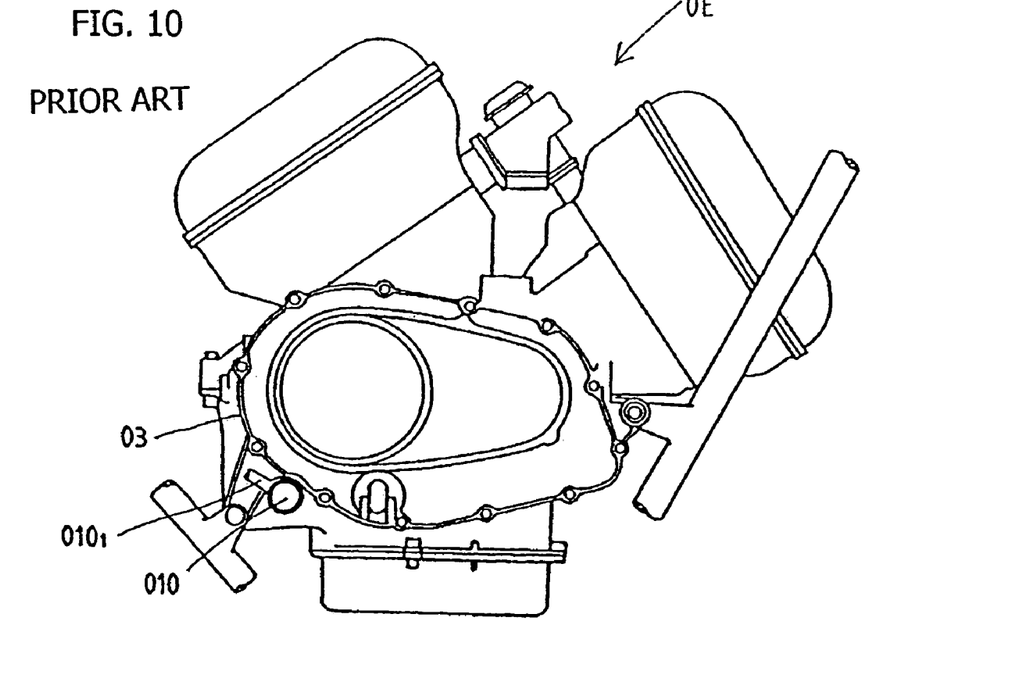
FIG. 10 is a side view of an internal combustion engine including a gear position sensor according to a prior art design.
Figure 11:
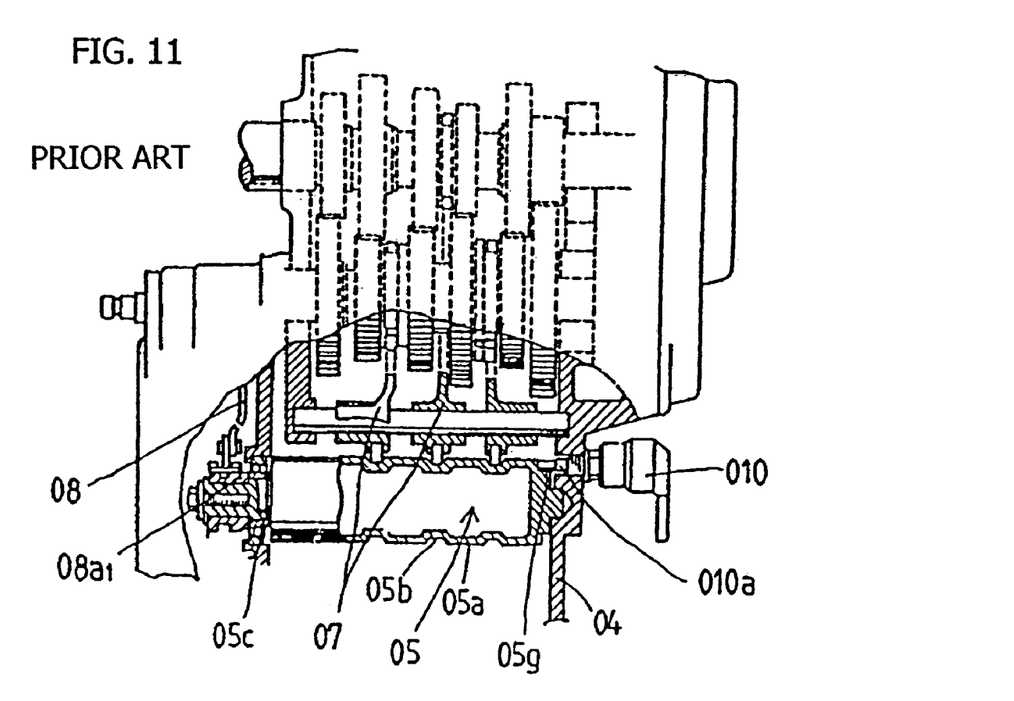
FIG. 11 is a rear plan view, partially in cross-section, of a lower part of the engine of FIG. 10, showing an essential structural portion according to the prior art design.

As shown in FIGS. 10 and 11, a shift drum 05 in the conventional foot-operated transmission, described in the above-mentioned patent reference, has a structure in which both end boss portions thereof are shaft-supported on a transmission case 04 integrated with a crankcase 03 of an internal combustion engine 0E.

In this known design, an engaging and stopping pin provided at the left end 05c thereof is engaged with and disengaged from a pawl $08a_1$ at the tip end of a shift arm 08, operated by a rocking operation of a gear-change pedal. When the gear-change pedal is rocked, the shift drum 05 is turned. This turning movement of the shift drum moves gears of a speed reduction gear train in the left-right direction through a shift fork 07, engaged with a plurality of (three) lead grooves 05b in the outer circumferential surface 05a of the shift drum. In this way, a gear change operation desired by the rider is achieved.

In the known arrangement shown in FIGS. 10–11, the gear position detector (sensor) 010 is mounted at a rear lower portion of the transmission case 04, due to the arrangement of the shift drum 05 on the lower side, relative to a main shaft and a counter shaft. The detector 010 is mounted on the outside of a side wall of the transmission case 04 at a shaft support portion thereof which supports a shaft of the shift drum 05. A detection pin 010a of the detector 010 extends through the transmission side wall, so as to contact with a cam surface 05g at an end face of the shift drum 05.

The gear position detector 010 is located at a rear lower portion of a clutch, in view of the constitution of the transmission, and the mounting position thereof is in a depression, defined between a projected portion of the case 04, surrounding the clutch, and the vehicle body, as shown in FIGS. 10 and 11.

In the drawing, symbol $010_1$ denotes a cable for the detector 010, which is connected to a display apparatus, such as an indication lamp, provided at a gauge panel (not shown) at a front portion of the vehicle body.

In a system in which the layout position of the shift drum is on the lower side, relative to the positions of the main shaft and the counter shaft provided in the transmission case, as described in the above-mentioned patent reference, the gear position sensor projects from the outer wall of the case, and is disposed in a depression between a projected portion of the case and the vehicle body, so that the sensor does not constitute an obstacle on the surface of the case, and so that the risk of contact, between a human body or other thing and the sensor, is reduced.

However, the depression defined between the projected portion of the outside wall of the transmission case surrounding the clutch, and the vehicle body is not necessarily a satisfactory mounting place for the sensor, because the projected portion of the case is very close to the mount portion of the sensor. Therefore, the projected portion constitutes an obstacle at the time of mounting the sensor to the case from the outside, and makes the mounting operation difficult to carry out.

On the other hand, where the position of the shift drum in the transmission case is selected at a higher location, relative to the main shaft and the counter shaft provided in the transmission case, the shift drum has such a positional relationship as to be contained within the outside diameter of the clutch as viewed sideways, and the shift drum is located substantially on the back side of the clutch as viewed sideways.

The selection of the layout position of the shift drum in such a positional relationship as to be contained within the outside diameter of the clutch makes it possible to provide a generally satisfactory place as the mounting position of the gear position sensor (detector) to be mounted in the projecting state, from the viewpoint of obviating the direct contact of a human body or other thing with the sensor, even where the sensor is in an exposed state.

However, while the selection of the higher layout position of the shift drum has merit, the selection, on the other hand, gives rise to complication of the mounting structure of the gear position sensor and difficulty in mounting the sensor. Specifically, in external mounting of the sensor after the clutch is mounted in position, that projected portion of the transmission case which surrounds the clutch constitutes an obstacle, and the available mounting space is very narrow, leading to difficulty in the mounting operation and requiring a specialized mounting structure.

In addition, checking of the mounted condition of the sensor by service personnel is made difficult, because the mounting position is on the sheer back side of the clutch as viewed sideways, and it is difficult to remove the sensor for maintenance and inspection thereof.

Although the known devices have some utility for their intended purposes, there is still a need to provide an improved location for mounting a gear position sensor on a transmission case, and for an improved sensor which has a mounting structure optimum for the selected mounting position, for solving the above-mentioned problems in the mounting of the gear position sensor in the background art. In particular, there is a need for an improved mounting location and sensor to solve the above-mentioned problems when the shift drum is disposed at a higher position relative to the main shaft and the counter shaft.

SUMMARY OF THE INVENTION

The present invention relates to a gear position detection system, including at least one sensor having characteristic features in the position and structure of mounting thereof to a crankcase, integrated with the transmission case. The system hereof is provided to solve the above-mentioned problems. A gear position sensor according to the present invention is externally mounted to an outer wall of the case in a projecting state, and has characteristic features in the mounting position and structure thereof, as will be further described herein.

In a first aspect of the invention, a gear position sensor is provided for a transmission including a shift drum turned by stepping on a change pedal through a shift arm. The transmission also includes shift gears, which are changed by moving a shift fork in the left-right direction of the engine. The shift fork is operated by the change pedal, is engaged with lead grooves provided in the outer circumferential surface of the shift drum, and is operable to move the drum.

The gear position sensor is mounted to a rear wall portion of a lower case of at least two cases formed by dividing an integrated crankcase and transmission case of an internal combustion engine into upper and lower portions.

In a second aspect of the present invention, in a gear position sensor for a transmission of the type described, the gear position sensor is mounted to the transmission case such that the moving direction of a detection pin thereof is orthogonal to the direction of the turning axis of the shift drum.

Furthermore, in a third aspect of the present invention, in a gear position sensor for a transmission of the type described, the gear position sensor is disposed in a space defined between a main frame, a lower case, and a swing arm.

In the gear position sensor for a transmission according to the first aspect of the invention, the gear position sensor is mounted to the rear wall portion of the lower case of at least two cases formed by dividing an integrated crankcase and transmission case into upper and lower portions. Therefore, even where the gear position sensor is exposed and projecting from the case, it does not constitute an obstacle, and the likelihood of other things coming into direct contact with the sensor can be reduced. Accordingly, the sensor is protected, the gear position sensor is mounted in a beneficial condition, and the useful life of the sensor is extended.

In the gear position sensor for a transmission according to the second aspect of the invention, the gear position sensor is mounted in such a layout that the moving direction of a detection pin thereof is orthogonal to the direction of the turning axis of the shift drum. Therefore, since the sensor would not project in the vehicle width direction, the risk of direct contact of other things with the sensor can be minimized, and the sensor is protected from external forces, even where it is mounted in an exposed state.

In addition, it is comparatively easy to position the sensor relative to the shift drum. In mounting the sensor, it is possible to achieve a simpler mounting structure. An operation of checking the mounted condition is easy to carry out, resulting in that workability in the mounting operation can be enhanced. Besides, since removal of the sensor at the time of maintenance, inspection or the like thereof can be easy to carry out, it is also possible to achieve easier maintenance.

In the gear position sensor for a transmission according to the invention according to the third aspect, the gear position sensor is disposed in the space defined between the main frame, the lower case, and the swing arm. Therefore, effective utilization of the space can be achieved.

DETAILED DESCRIPTION

Figure 1:
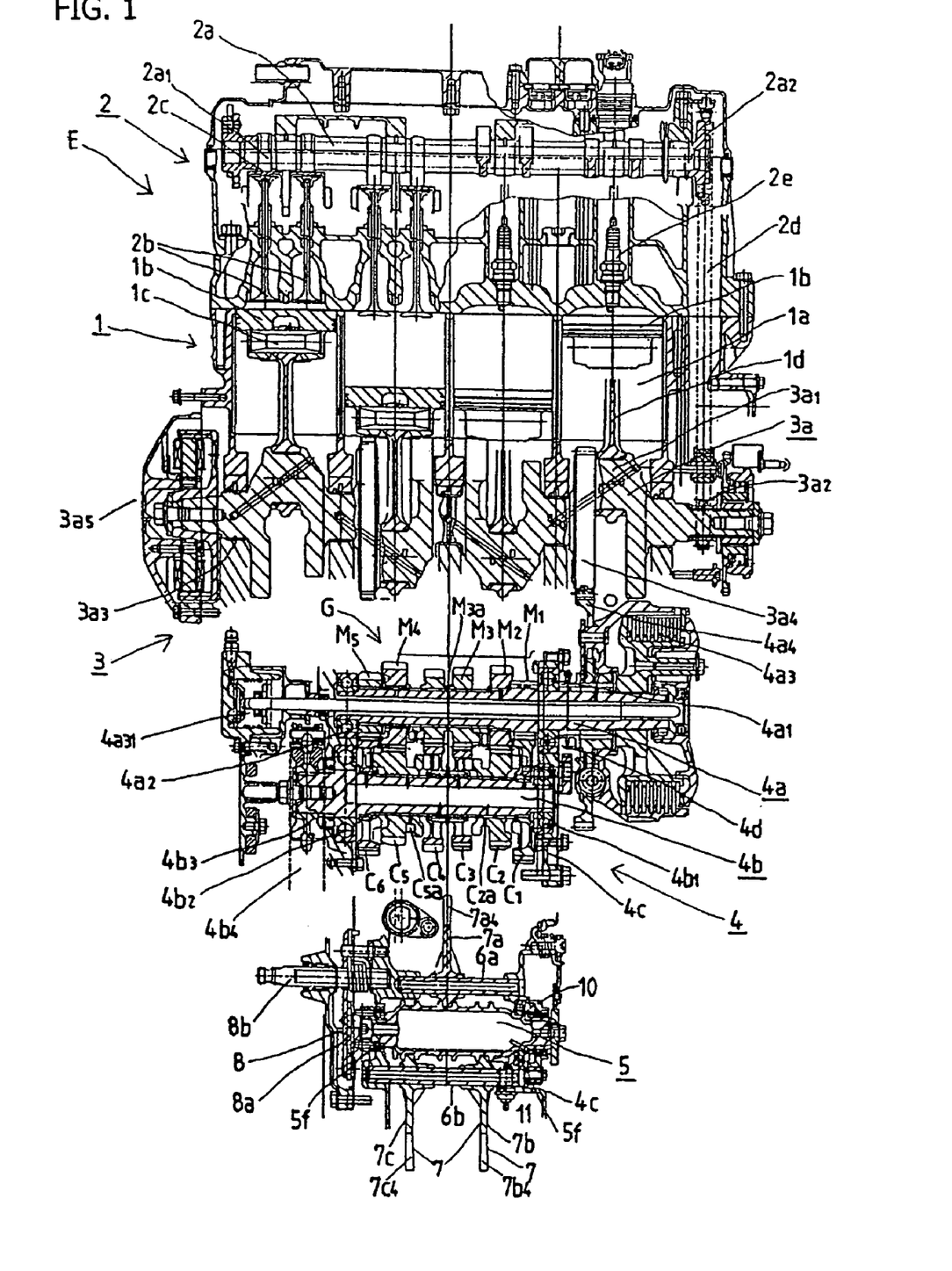
FIG. 1 is a partially exploded front sectional view, showing the structure of an internal combustion engine including a gear position detection system according to an illustrative embodiment of the present invention, where the engine is adapted to be transversely mounted in a vehicle frame.
Figure 2:
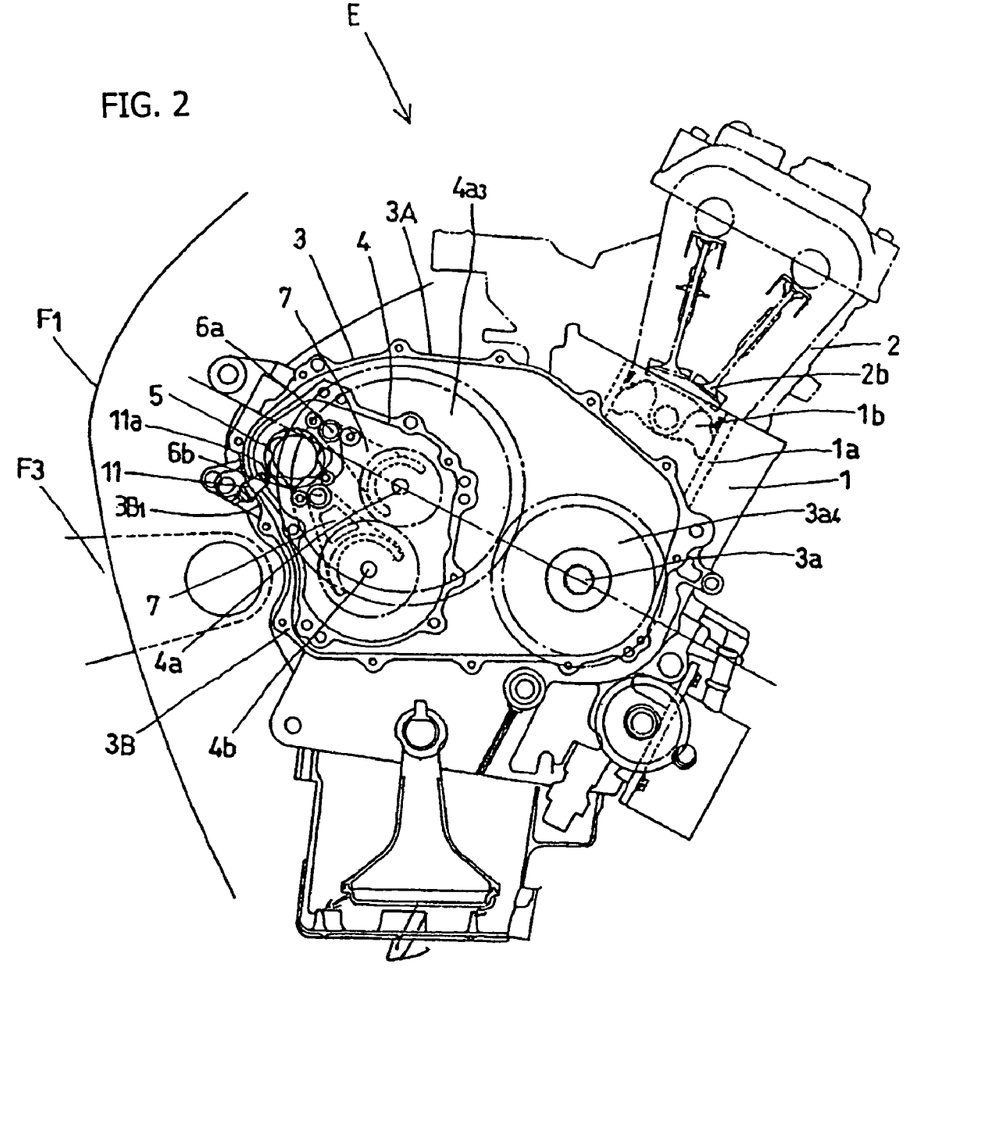
FIG. 2 is a side view of the internal combustion engine of FIG. 1, including the gear position detection system according to the selected embodiment of the present invention.

In FIGS. 1 and 2, an internal combustion engine E is shown. The internal combustion engine E is a four-stroke-cycle four-cylinder internal combustion engine. A main body structure portion of the engine E includes a cylinder block 1, a cylinder head 2 fixed to the cylinder block 1 by bolts, and a crankcase 3 having a split-into-two structure in which the cylinder block 1 and an upper case 3A of the crankcase 3 are integral with each other.

The cylinder block 1 is provided with four cylinder bores 1a arranged in the vehicle width direction, and a piston 1b is slidably fitted in each of the cylinder bores 1a. Each of the pistons 1b is rockably attached to a small end portion of a connecting rod 1d through a piston pin 1c, and a large end portion of the connecting rod 1d is turnably connected to a crank pin $3a_1$ of a crankshaft 3a, whereby the crankshaft 3a is driven to rotate clockwise in FIG. 2 in conjunction with the reciprocation of the pistons 1b and through the connecting rods 1d.

A cam shaft 2a and intake and exhaust valves 2b for opening and closing intake and exhaust ports attendant on the rotation of the cam shaft 2a are provided in the cylinder head 2. Each of the intake and exhaust valves 2b is in a closure condition by being normally biased by a valve spring, and each of the intake and exhaust valves 2b is opened when a tappet 2c at an upper portion thereof is pressed by a cam $2a_1$ under rotation of the cam shaft 2a, upon which a desired intake or exhaust action is performed.

Driving of the cam shaft 2a to rotate for operations of the intake and exhaust valves 2b is conducted through a timing chain 2d which is wrapped around a sprocket $2a_2$ provided at one end of the cam shaft 2a and a sprocket $3a_2$ provided on the crankshaft 3a. The cam shaft 2a is driven to rotate at a rotational speed of ½ times that of the crankshaft 3a, whereby each of the intake and exhaust valves 2b is opened and closed once during two revolutions of the crankshaft 3a.

In addition, a spark plug 2e is mounted, at a position fronting on a combustion chamber formed at an upper portion of each of the cylinder bores, of the cylinder head 2.

The crankcase 3 is integrally formed with a transmission case portion 4. The crankcase 3 integrally formed with the transmission case portion 4 has a structure of being bisected into upper and lower portions (see FIG. 2). The upper case 3A of the crankcase 3 is formed as one body with the cylinder block 1, and a lower case 3B is fixed to the upper case 3A by bolts, whereby the crankcase 3 and the cylinder block 1 are united with each other. As shown in FIG. 2, the transmission case portion 4 in the crankcase 3 is provided at a left side position in the figure, away from the cylinder block 1 side of the case 3, in a side view of the engine.

The crankshaft 3a is disposed in the crankcase 3, and is rotatably supported on the crankcase 3 through journal bearing portions $3a_3$ thereof. As mentioned above, the large end portions of the connecting rods 1d, for transmitting the reciprocations of the pistons 1b, are turnably attached to the crank pins $3a_1$ of the crankshaft 3a. In addition, a primary drive gear $3a_4$, for transmitting power for driving the vehicle to a speed change gear group G, is attached to a right-side position comparatively close to an end portion, of the crankshaft 3a. Numeral $3a_5$ denotes a generator.

A main shaft 4a, a counter shaft 4b, and further a shift drum 5 and the like are disposed in the transmission case portion 4 integrated with the crankcase 3. The main shaft 4a and the counter shaft 4b are disposed in a mutually parallel positional relationship, with the main shaft 4a at an upper portion and the counter shaft 4b at a lower portion, with reference to the transmission case portion 4 (see FIG. 2).

A portion of the main shaft 4a, near one end (right end) is rotatably supported on a holder (a cover member of the transmission case 4) 4c of the transmission case portion 4 through a bearing $4a_1$, and the one end portion projects through an opening portion 4d of the transmission holder 4c. A multiple-disk clutch $4a_3$ which is normally connected and the fastening of which is released by an action of an oil hydraulic action device $4a_{31}$ at the time of operation is provided at the projecting shaft portion, and, further, a primary driven gear $4a_4$ meshed with the primary drive gear $3a_4$ attached to the crankshaft 3a is loosely fitted to the projecting shaft portion. On the other hand, the other end (left end) of the main shaft 4a is rotatably supported on the crankcase 3 through a bearing $4a_2$, and the shaft end portion is closed with the case 3.

The rotational drive force of the crankshaft 3a is transmitted to the main shaft 4a through the meshing between the primary drive gear $3a_4$ provided at the right-side position near the end portion of the crankshaft 3a and the primary driven gear $4a_4$ on the main shaft 4a and through the connection-disconnection actions of the multiple-disk clutch $4a_3$ under the action of the oil hydraulic action device $4a_{31}$.

One end (right end) of the counter shaft 4b, is rotatably supported on the transmission holder 4c through a bearing $4b_1$, and the shaft end portion is closed with the holder 4c. On the other side, the other end (left end) of the counter shaft 4b is supported on the crankcase 3 through a bearing $4b_2$, the shaft end portion projects through an opening portion of the crankcase 3, and a drive sprocket wheel $4b_3$ is attached to the projecting shaft portion.

The main shaft 4a is provided thereon with five gears $M_1$ to $M_5$, while the counter shaft 4b is provided thereon with six gears $C_1$ to $C_6$ at positions opposed to the gears $M_1$ to $M_5$ and normally meshed with the gears $M_1$ to $M_5$. Of the combinations of the normally meshed gears in the speed change gear group G, one is appropriately selected by the operation of shift forks 7 attendant on the rotation of the shift drum 5 which will be described in detail later, whereby the rotational drive force transmitted from the crankshaft 3a to the main shaft 4a is transmitted to the counter shaft 4b at a desired gear ratio. Specific description of the gear change operation will be made later, and, therefore, it is omitted here.

Then, the drive force transmitted to the counter shaft 4b at a desired gear ratio is transmitted to a rear wheel Wr of the vehicle, not shown, through an endless chain $4b_4$ which is laid between the drive sprocket wheel $4b_3$ attached to the other end (left end) of the counter shaft 4b and a driven sprocket wheel on the side of a drive wheel not shown.

Meanwhile, the shift drum 5 constituting an important structural portion in this embodiment is disposed at a rear portion in the transmission case portion 4 on the left side of the main shaft 4a in a side view of the internal combustion engine E, as shown in FIG. 2. Portions of the shift drum 5 near both end portions are supported by the lower case 3B of the crankcase 3 and the transmission holder 4c through bearings 5f, 5f, respectively (see FIGS. 1 and 3), and the layout condition thereof is such that the longitudinal rotational axis of the shift drum 5 is parallel to the main shaft 4a and the counter shaft 4b.

Two guide shafts 6a and 6b are provided in space portions between the shift drum 5 and the main shaft 4a and the counter shaft 4b, in parallel to the longitudinal axis of the shift drum 5. Both end portions of the two guide shafts 6a and 6b are fixedly supported by the lower case 3B of the crankcase 3 and the holder (cover member of the transmission case portion) 4c of the transmission case portion 4, and the shift forks 7 are slidably attached respectively to the two guide shafts 6a and 6b.

In addition, two gear position sensors 10 and 11 for detecting a gear position and a neutral position attendant on the turning of the shift drum 5 are provided. Of the sensors 10 and 11, one sensor 10 is a sensor for detecting the gear position at each speed change stage (hereinafter referred to as "gear position sensor"). The sensor 10 is attached to the holder 4c of the transmission case portion 4 by a bolt $B_2$. The gear position sensor 10 is so disposed as to face a stopper plate $5d_1$ (described later) which has a star-like outside shape and is provided at the right end of the shift drum 5.

The other sensor 11, of the gear position sensors 10 and 11, is a sensor attached to a wall surface portion $3B_1$ of the lower case 3B of the crankcase 3 (see FIG. 2), and is a sensor having characteristic features in the position and structure of mounting thereof to the wall surface portion $3B_1$ of the lower case 3B. The neutral safety switch 11 is a sensor for the exclusive detection of a neutral position, namely, for detecting the neutral position in the turning of the shift drum 5 (hereinafter referred to as "neutral safety switch").

The details of the structures of the shift drum 5, of the gear position sensor 10 for detecting the instant gear, and the neutral safety switch 11 for detecting the neutral position selected by the shift drum 5 will be described below, based on FIGS. 3 to 9.

Figure 3:
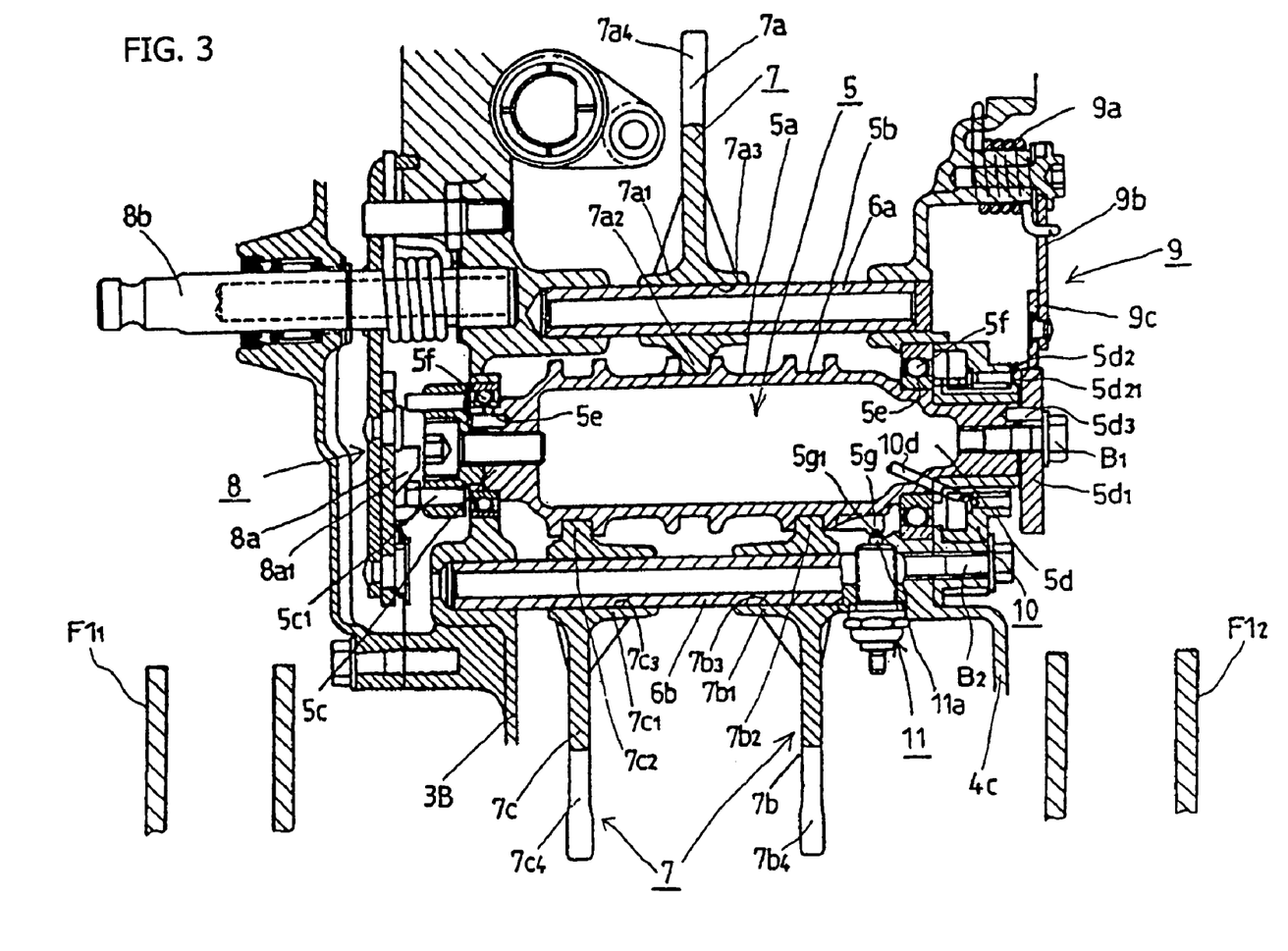
FIG. 3 is a cross-sectional detail view of a lower part of the engine of FIG. 1, illustrating a shift drum and two gear position sensors according to the selected embodiment of the present invention.

As shown in FIG. 3, the shift drum 5 includes a hollow cylindrical tubular member having a predetermined length and a diameter of about 40 mm, and is ordinarily formed as a casting of pig iron. The outer circumferential surface 5$a$ of the shift drum 5 is provided with three lead grooves 5$b$ extending in the circumferential direction, and both end portions 5$c$ and 5$d$ of the shift drum 5 are slightly smaller in diameter than the central portion thereof. The shift drum 5 is provided with bearing mount portions 5$e$, 5$e$ in the vicinity of both the smaller-diameter end portions thereof. Parts of the shift drum 5 near both end portions threof are supported on the lower case 3B of the crankcase 3 and the holder 4$c$ of the transmission case portion 4 through the bearings 5$f$, 5$f$ mounted onto the mount portions 5$e$, 5$e$, whereby the shift drum 5 is made turnable.

As has been described above, the outer circumferential surface 5$a$ of the shift drum 5 is provided with the three lead grooves 5$b$, extending in the circumferential direction thereof. Shift forks 7$a$, 7$b$ and 7$c$ are engaged with the lead grooves 5$b$ through slide pins $7a_2$, $7b_2$ and $7c_2$ formed at boss portions $7a_1$, $7b_1$ and $7c_1$, thereof, respectively. In addition, the shift forks 7$a$, 7$b$ and 7$c$ are slidably fitted over the above-mentioned guide shafts 6$a$ and 6$b$ through hole portions $7a_3$, $7b_3$ and $7c_3$ formed in the boss portions $7a_1$, $7b_1$ and $7c_1$ thereof. Furthermore, the shift forks 7$a$, 7$b$ and 7$c$ have their tip ends formed as bifurcated portions $7a_4$, $7b_4$ and $7c_4$, which are respectively engaged with predetermined shift gears, as will be described later.

The respective guide shafts 6$a$ and 6$b$ are about 10 to 12 mm in diameter, and are disposed to be mutually parallel and extend parallel to the shift drum 5. The guide shafts 6$a$, 6$b$ are comparatively close to the shift drum 5, and both end portions of the guide shafts are fixedly supported by the lower case 3B of the crankcase 3 and the holder 4$c$ of the transmission case portion 4. The upper shift fork 7$a$ is slidably supported on the upper guide shaft 6$a$, while the two lower shift forks 7$b$ and 7$c$ are slidably supported on the lower guide shaft 6$b$, as shown.

Each of the shift forks 7$a$, 7$b$ and 7$c$ is engaged with a predetermined gear among the speed change gear group G which is mounted to the main shaft 4$a$ or the counter shaft 4$b$ (see FIG. 1). The bifurcated portion $7a_4$ of the shift fork 7$a$ is engaged with a circumferential groove $M_3a$ of the shift gear M3 on the main shaft 4$a$, whereas the bifurcated portion $7b_4$ of the shift fork 7$b$ is engaged with a circumferential groove $C_2a$ of the shift gear $C_2$ on the counter shaft 4$b$, and the bifurcated portion $7c_4$ of the shift fork 7$c$ is engaged with a circumferential groove $C_5a$ of the shift gear $C_5$ on the counter shaft 4$b$.

In addition, an engaging pin $5c_1$ is provided at the left end 5$c$ of the smaller-diameter both end portions of the shift drum 5, and the pin $5c_1$ is so provided as to be engaged with and disengaged from a shift arm 8; more specifically, the pin $5c_1$ is so disposed as to be engaged with and disengaged from a feed projection $8a_1$ provided on a shifter plate 8$a$. In response to a rocking operation of the shift arm 8 through a pedal mount shaft 8$b$ in conjunction with a foot pedal which is not shown, the feed projection $8a_1$ of the shifter plate 8$a$ is engaged with and disengaged from the engaging pin $5c_1$, whereby the shift drum 5 is turned by a predetermined amount.

Furthermore, the stopper plate $5d_1$ having a star-like outside shape is provided at the right end 5$d$ of the smaller-diameter both end portions of the shift drum 5. The stopper plate $5d_1$ has an outer circumferential surface in a roughly star-like shape including recessed portions and projected portions alternately, though not clearly shown in the figure. A roller (not shown in FIG. 3) of a stopper roller assembly 9 is in springy contact with the outer circumferential surface of the stopper plate $5d_1$ through lever members 9$b$ and 9$c$ biased by the elastic force of a spring member 9$a$.

The turning of the shift drum 5 is transmitted through the stopper plate $5d_1$ as a rocking motion against the spring member 9$a$ of the stopper roller assembly 9, by the recessed portion and the projected portion of the outer circumferential surface of the stopper plate $5d_1$, thereby giving a clicking feeling to the stepping operation on the pedal by the rider. Thus, when the turning of the shift drum 5 is stopped after a predetermined turning thereof, the above-mentioned roller is brought into spring engagement with a predetermined one of the recessed portions in the outer circumference of the stopper plate $5d_1$ due to the elastic force, whereby the turning stopped condition after completion of a predetermined speed change operation by the turning of the shift drum 5 is maintained.

Figure 4:
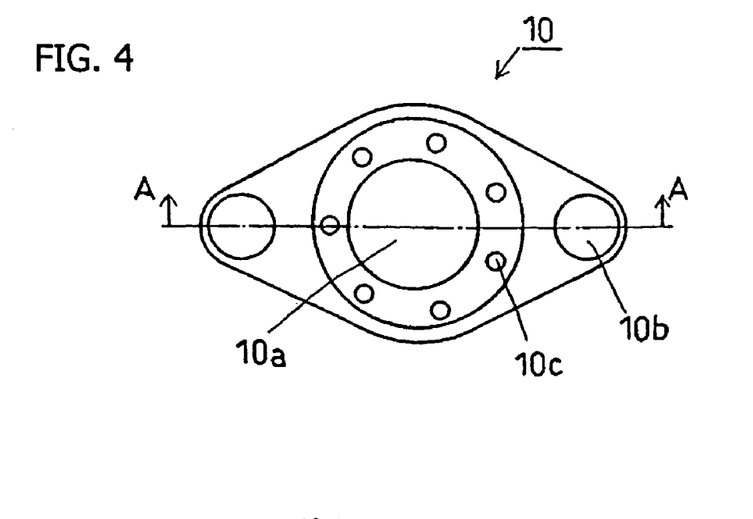
FIG. 4 is a front plan view showing one of the gear position sensors according to an embodiment of the present invention.
Figure 5:
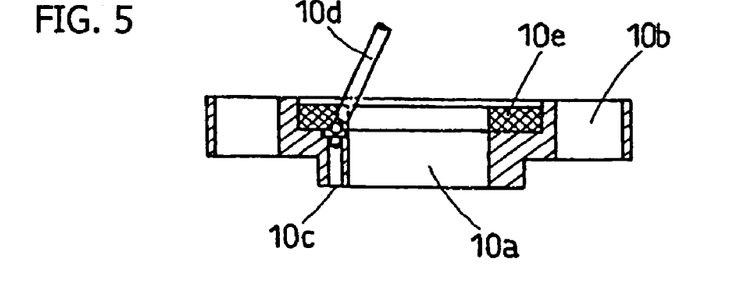
FIG. 5 is a sectional view of the gear position sensor of FIG. 4, taken along the line A—A therein.

The gear position sensor 10, which is one of the two gear position sensors, has a structure as shown FIGS. 4–5, and includes a main body portion with a large central opening 10$a$ formed therethrough. In the condition where the central opening 10$a$ of the gear position sensor 10 is loosely fitted on the smaller diameter portion at the right end of the shift drum 5, and in a layout condition where a side surface portion on one side thereof corresponds to the inside surface of the stopper plate $5d_1$, a side surface portion on the other side is brought into contact with a portion near a shift drum support portion of the holder 4$c$ (cover member of the transmission case portion) of the transmission case portion 4 supporting the right end of the shift drum 5. In this arrangement, the gear position sensor 10 is fixed in place on the case 4 by placing bolts $B_2$ through mount holes 10$b$ and tightening the bolts (see FIGS. 3 and 4).

Figure 6:
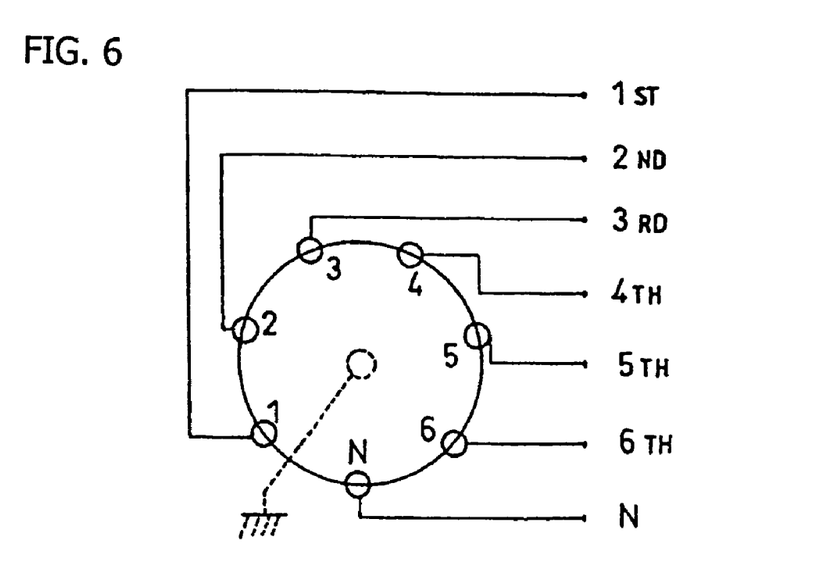
FIG. 6 is a functional schematic diagram which illustrates the operation of a gear position detector in the gear position sensor shown in FIG. 4.

The gear position sensor 10 is provided, in a side surface on one side thereof, with a plurality of terminal portions 10$c$, as is clear from FIGS. 4 to 6. In this embodiment, a total of seven terminal portions 10$c$ are provided. The terminal portions 10$c$ are provided as terminals 1 to 6 corresponding respectively to the first to sixth speeds, and a seventh terminal N corresponding to the neutral position. The terminal portions 10$c$ have a layout structure corresponding to the turning stop positions of the shift drum 5 by the stopper plate $5d_1$ in the predetermined speed change positions, and a wire or cable 10$d$ for passing an electric current is connected to each of the terminal portions 10$c$ (FIG. 6). Symbol 10$e$ denotes a resin-filled portion such as, for example, a portion filled with epoxy resin.

Figure 7A:
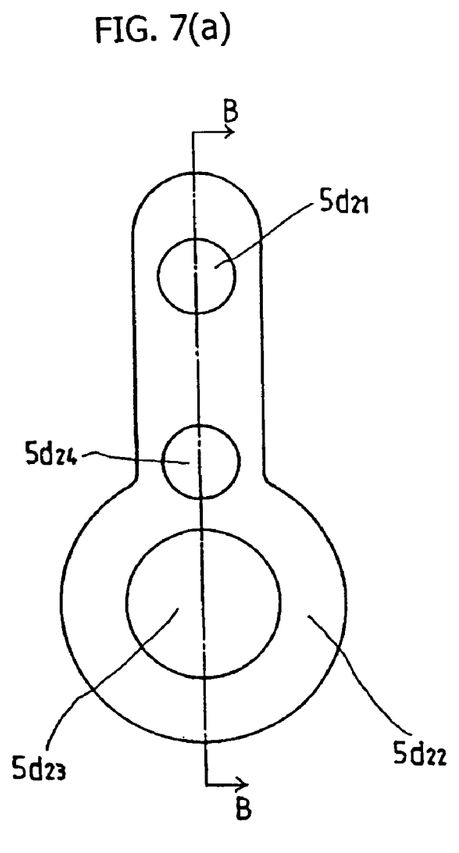
FIG. 7(a) is a front plan view of a rotor used for gear position detection in the gear position sensor of FIG. 4.
Figure 7B:
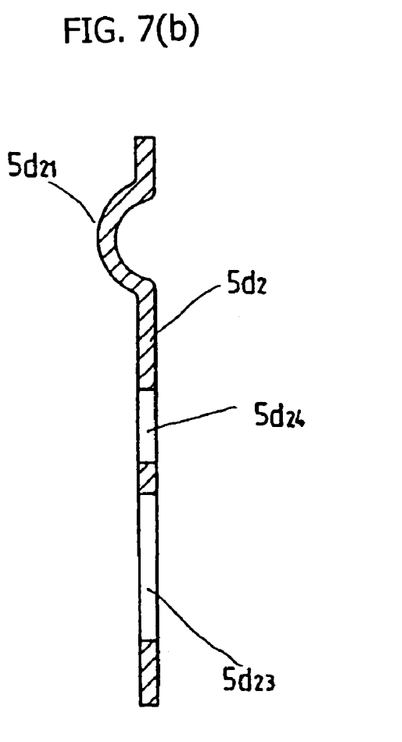
FIG. 7(b) is a sectional view of the rotor, taken along line B—B of FIG. 7(a).

In addition, as shown in FIG. 3, an elastic rotor $5d_2$, (see FIG. 7) made of a conductive metal and having a contact projection $5d_{21}$ for making contact with a selected terminal of the terminal portions 10$c$, is fixed to the smaller diameter portion at the right end of the shift drum 5. The elastic rotor $5d_2$ is retained to the shift drum 5, together with the star-like stopper plate $5d_1$, by the bolt B extending through a mounting hole $5d_{23}$ formed in its base portion $5d_{22}$, so that it is turned concurrent with the turning of the shift drum 5. In the drawing, symbol $5d_{24}$ denotes a hole formed in the rotor $5d_2$, which receives a pin member $5d_3$ for preventing relative turning among the shift drum 5, the stopper plate $5d_1$ and the rotor $5d_2$.

As shown in FIGS. 7(a) and (b), the rotor $5d_2$ consists of a plate-like member formed from an electrically conductive material having appropriate elasticity, which is provided with the above-mentioned mounting hole $5d_{23}$ in its base portion $5d_{22}$, which is enlarged for this purpose, and is provided at its tip end with the contact projection $5d_{21}$ composed of a projected bent portion for making contact with the above-mentioned terminal portion 10c. Under the elasticity of the rotor $5d_2$, the contact projection $5d_{21}$ of the plate-like member is normally held in contact, at an appropriate elastic pressure, with the side surface portion on one side of the gear position sensor 10, on which the terminal portions 10c are provided.

At a turning stop position of the stopper plate $5d_1$ in a predetermined speed change position attendant on the turning of the shift drum 5, the contact projection $5d_{21}$ of the rotor $5d_2$ makes contact with a predetermined terminal portion 10c corresponding to the turning stop position, whereby passage of an electric current via the terminal portion 10c is achieved. As a result, a signal corresponding to the predetermined speed change position is transmitted to the display portion arranged at the gauge board (not shown) at a front portion of the vehicle, via the wire or cable 10d connected to the terminal portion 10c, to turn on an indicator, thereby informing the rider of the predetermined speed change position.

In addition, the outer circumferential surface 5a of the shift drum 5 is provided, in the vicinity of the bearing mount portion 5e at the right end thereof in FIG. 3, with a cam surface structure portion 5g in a side-by-side relationship with the lead groove 5b. A cam surface of the cam surface structure portion 5g is provided with a detection cam $5g_1$ corresponding to a neutral action point by the lead groove 5b. A detection pin 11a of the neutral safety switch 11, which is the other of the gear position sensors, is opposed to the cam surface of the cam surface structure portion 5g, with a small gap therebetween, or is pressed against the cam surface with a slight pressure.

Figure 8:
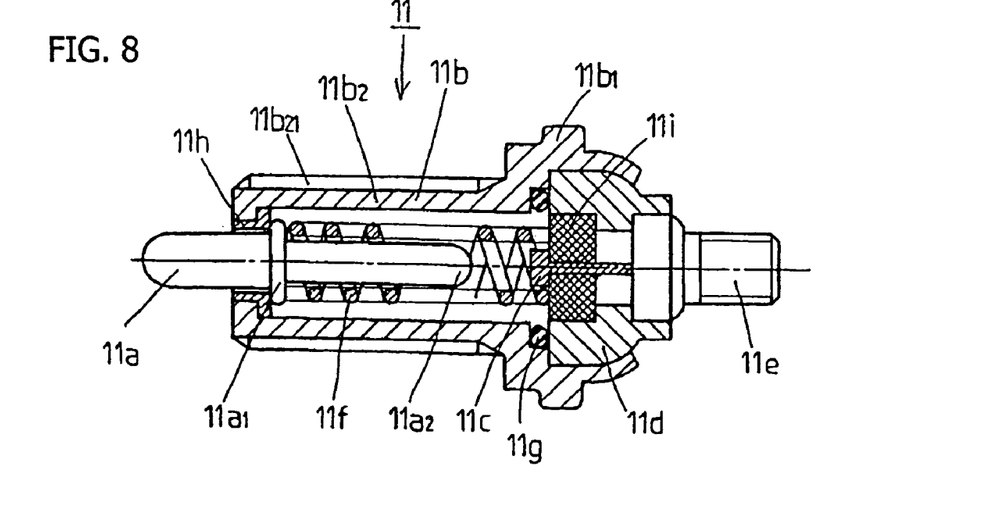
FIG. 8 is a cross-sectional view of a neutral safety switch which is another component of the gear position detection system according to the illustrative embodiment of the present invention.

As shown in FIG. 8, the neutral safety switch 11, which is the other of the gear position sensors, has a structure including: a main body portion 11b including a head portion $11b_1$ located so that it can be turned for fastening by a spanner wrench, and a hollow shaft portion $11b_2$ extending from the head portion $11b_1$ and having an outside portion formed as a screw portion $11b_{21}$; the detection pin 11a projecting from one end portion of the hollow shaft portion $11b_2$ of the main body portion 11b; a base terminal portion 11d integrally fixed to the head portion $11b_1$ of the main body portion 11b; a contact plate 11c; a terminal portion 11e which is a wire connection portion connected to the base terminal portion 11d; and the like.

The detection pin 11a is axially movable relative to the main body portion 11b, in the hollow shaft $11b_2$ of the main body portion 11b, and is pressed by a spring member 11f disposed in the main body portion 11b through a flange portion $11a_1$ thereof so that a tip end portion thereof normally projects outwards. With the tip end portion externally pushed in, a rear end portion $11a_2$ of the detection pin 11a is brought into contact with the contact plate 11c, to cause passage of an electric current, whereby a signal is transmitted from the terminal portion 11e to the display portion arranged at the gauge board on the front side of the vehicle through the wire or cable (not shown), to turn on an appropriate indicator in the display portion. Numeral 11g denotes an O-ring, 11h a slide guide member formed of a resin, and 11i denotes a spring receiving member made of a resin.

The opposition of the detection pin 11a of the sensor 11 to the cam surface of the cam surface structure portion 5g with a small gap therebetween or the contact of the detection pin 11a with the cam surface with a slight pressure is so conducted that the detection pin 11a is opposed to or brought into contact with the cam surface from a direction orthogonal to the cam surface. In short, as a result, the neutral safety switch 11 is positioned in such a state that the detection pin 11a is orthogonal to the turning direction of the shift drum 5, and the sensor 11 is firmly screwed to, and mounted in a sealed condition to, the wall surface portion $3B_1$ of the lower case 3B of the crankcase 3 integrated with the transmission case portion 4, from the outside of the wall surface portion by the screw portion $11b_{21}$ of the main body portion shaft portion $11b_2$ thereof, with a layout structure for the orthogonal condition (see FIGS. 2 and 3).

With the detection pin 11a pushed in by the detection cam $5g_1$ of the shift drum 5 through the opposition to or contact with the cam surface of the cam surface structure portion 5g at the outer circumferential portion of the shift drum 5 attendant on the turning of the shift drum 5, a signal of the neutral position detected by the sensor 11 is transmitted through the wire or cable (not shown) to the display portion arranged at the gauge board (not shown) at the front portion of the vehicle body, to turn on an indicator. The indication thus turned on is different from the indicator of the neutral position in the gear position sensor 10, and the indicator of the neutral position by the neutral safety switch 11 is clearly turned on at such a position as to be most visible to the rider.

Next, the speed change operations at each stage by the shift drum 5 and the operations of the gear position sensors, namely, the gear position sensor 10 and the neutral safety switch 11 will be briefly described, based on FIGS. 3, 6 and 7.

When the speed change gear group G mounted to the main shaft 4a and the counter shaft 4b are placed in a neutral state, the rotational drive force of the main shaft 4a is not transmitted to the counter shaft 4b. In this position, the contact projection $5d_{21}$ of the rotor $5d_2$ makes contact with the neutral terminal N of the terminal portions 10c of the gear position sensor 10, and the detection pin 11a of the neutral safety switch 11 is pushed in by the detection cam $5g_1$ of the cam surface structure portion 5g at the outer circumferential surface of the shift drum 5, resulting in that both the sensors 10 and 11 are operated for passage of electric current, to issue respective signals, whereby individual indicators of a neutral condition are turned on in the appropriate display portions disposed individually.

With the change pedal (not shown) stepped by the rider for a speed change, the shift arm 8 is turned through the pedal mount shaft 8b, and the turning of the shift arm 8 engages the feed projection $8a_1$ of the shift plate 8a with the engaging pin $5c_1$ of the left end 5c structure portion of the shift drum 5, whereby the shift drum 5 is turned by a predetermined amount (see FIG. 3).

As result of the turning of the shift drum 5, the shift fork 7b engaged with the lead groove 5b located at the right side of the outer circumferential surface 5a of the shift drum 5 is moved rightwards, the shift gear $C_2$ on the counter shaft side is moved, and a dog of the gear $C_2$ bites into the gear $C_1$ on the right side thereof, whereby the rotation of the main shaft 4a is transmitted from the gear $M_1$ to the gear $C_1$ and, further, through the gear $C_2$ to the counter shaft 4b, to perform a first-speed speed change. In this position, the contact projection $5d_{21}$ of the rotor $5d_2$ makes contact with the terminal 1 of the terminal portion 10c corresponding to the first speed of the gear position sensor 10, whereby a signal corresponding to the first-speed speed change is transmitted, to turn on an indicator at the display portion. Naturally, the detection pin 11a of the neutral safety switch 11 is not pushed in, and remains inactive.

With the shift drum 5 turned further, the shift gear $C_2$ moved rightwards at the time of the first speed is returned to its original position by the shift fork 7b, the shift gear $C_5$ on the counter shaft 4b is moved leftwards by the shift fork 7c, and a dog of the gear $C_5$ bites into the gear $C_6$ on the left side thereof. As a result, the rotation of the main shaft 4a is transmitted from the gear $M_5$ to the gear $C_6$ and, further, through the gear $C_5$ to the counter shaft 4b, to perform a second-speed speed change. In this instance, detection of the second speed and issuing of a corresponding signal by the gear position sensor 10 are conducted, to turn on an indicator, in the same manner as at the time of the first speed.

Indicators of the third-speed to sixth-speed speed change positions are each turned on in a manner equivalent to the above, so that the description thereof is omitted.

In the case of the third speed, the shift gear $C_5$ on the side of the counter shaft 4b which has been moved leftwards at the time of the second speed is moved rightwards by the shift fork 7c, and a dog of the gear $C_5$ bites into the gear $C_4$ on the side of the counter shaft 4a; in the case of the fourth speed, the shift gear $C_2$ on the side of the counter shaft 4b which has been moved rightwards by the shift fork 7b at the time of the first speed is moved leftwards by the shift fork 7b, and a dog of the gear $C_2$ engages gear $C_3$ on the side of the counter shaft 4b which is located on the left side thereof. In both cases, the rotational drive force of the main shaft 4a is transmitted to the counter shaft 4b.

In the case of the fifth speed, the shift gear M3 on the side of the main shaft 4a is moved rightwards by the shift fork 7a, and a dog of the gear $M_3$ engages gear $M_2$; in the case of the sixth speed, the shift gear $M_3$ is moved leftwards, oppositely to that at the time of the fifth speed, by the shift fork 7a, and a dog of the shift gear $M_3$ engages gear $M_4$ on the side of the main shaft 4a. In both cases, the rotational drive force of the main shaft 4a is transmitted to the counter shaft 4b.

In this manner, the speed change at each speed change position is performed, and the selection of the speed change position inclusive of the neutral position is displayed by turning on a signal in the display portion described above. As has been described above, the detection of the neutral position is conducted in a double condition with the detection of the neutral position by the neutral safety switch 11. The detections of the neutral position are individually displayed at the display portion; particularly, the display of the detection by the neutral position sensor 11 is performed by turning on a clear indicator at a most visible position, such as a central portion of a steering handlebar.

The outline of the structures and the operating conditions of the shift drum 5 and the gear position sensors, namely, the gear position sensor 10 and the neutral safety switch 11 are as has been described above.

Next, the position and structure of mounting of the gear position sensor constituting the most characteristic structure in this embodiment, namely, the neutral safety switch 11 onto the lower case 3B of the crankcase 3 will be further described, though partly overlapping with the above description.

The neutral safety switch 11 is mounted to the lower case 3B of the crankcase 3 which is bisected and integrated with the transmission case portion 4 as above-mentioned. The mounting position of the sensor 11 is at the case wall surface portion $3B_1$ at a rear portion of the lower case 3B (see FIG. 2), at a position in the vicinity of an upper-lower parting line of the crankcase 3, and at a portion adjacent to the mounting mating surface of the transmission holder (cover member of the transmission case 4) 4c.

The mounting wall surface portion $3B_1$ of the neutral safety switch 11 is a slightly downward wall surface where the case outside wall of a rear portion of the lower case 3B of the crankcase 3 is so bent as to turn around to the lower side. The sensor 11 is mounted in a projecting condition so that its longitudinal axis is substantially orthogonal to the wall surface of the wall surface portion $3B_1$; in addition, the detection pin 11a at its tip end portion is so directed that the extension line thereof overlaps with the axial center line of the shift drum 5, i.e., directed toward the extension line of a cross-sectional maximum diameter portion of the shift drum 5 (see FIGS. 2 and 3).

In mounting the sensor 11 onto the wall surface portion $3B_1$, the mounting position is at the wall surface portion $3B_1$ of the lower case 3B of the crankcase 3, so that the sensor 11 is mounted in the state of penetrating through the wall portion of the case 3B. The sensor 11 is mounted by screwing it, from the outside of the wall portion, into a through-hole bored in the wall portion until a neck stepped portion of the sensor 11 makes contact with the opening peripheral portion of the through-hole. The mounting is made so firmly as not to be loosened by vibration or the like, and in a sealed condition.

The neutral safety switch 11 is mounted to maintain such a relationship that, in the mounted condition thereof, the detection pin 11a of the sensor 11 is opposed to the cam surface of the cam surface structure portion 5g for neutral position detection provided on the outer circumferential surface 5g of the shift drum 5, with a small gap therebetween, or makes contact with the cam surface with a slight pressure, as described above (see FIG. 3). Thus, the mounting is so made that the neutral position is accurately detected by an axial movement of the detection pin 11a through the pressing of the pin 11a by the detection cam $5g_1$ of the cam surface structure portion 5g attendant on the turning of the shift drum 5.

The position and structure of mounting of the neutral safety switch 11, which is the gear position sensor in this embodiment, onto the lower case 3B of the crankcase 3 are as described above. Here, the mounting position and the mounting structure from the viewpoint of the vehicle body structure as a whole of the motorcycle will be briefly described based on FIG. 9, also for confirmation thereof.

Figure 9:
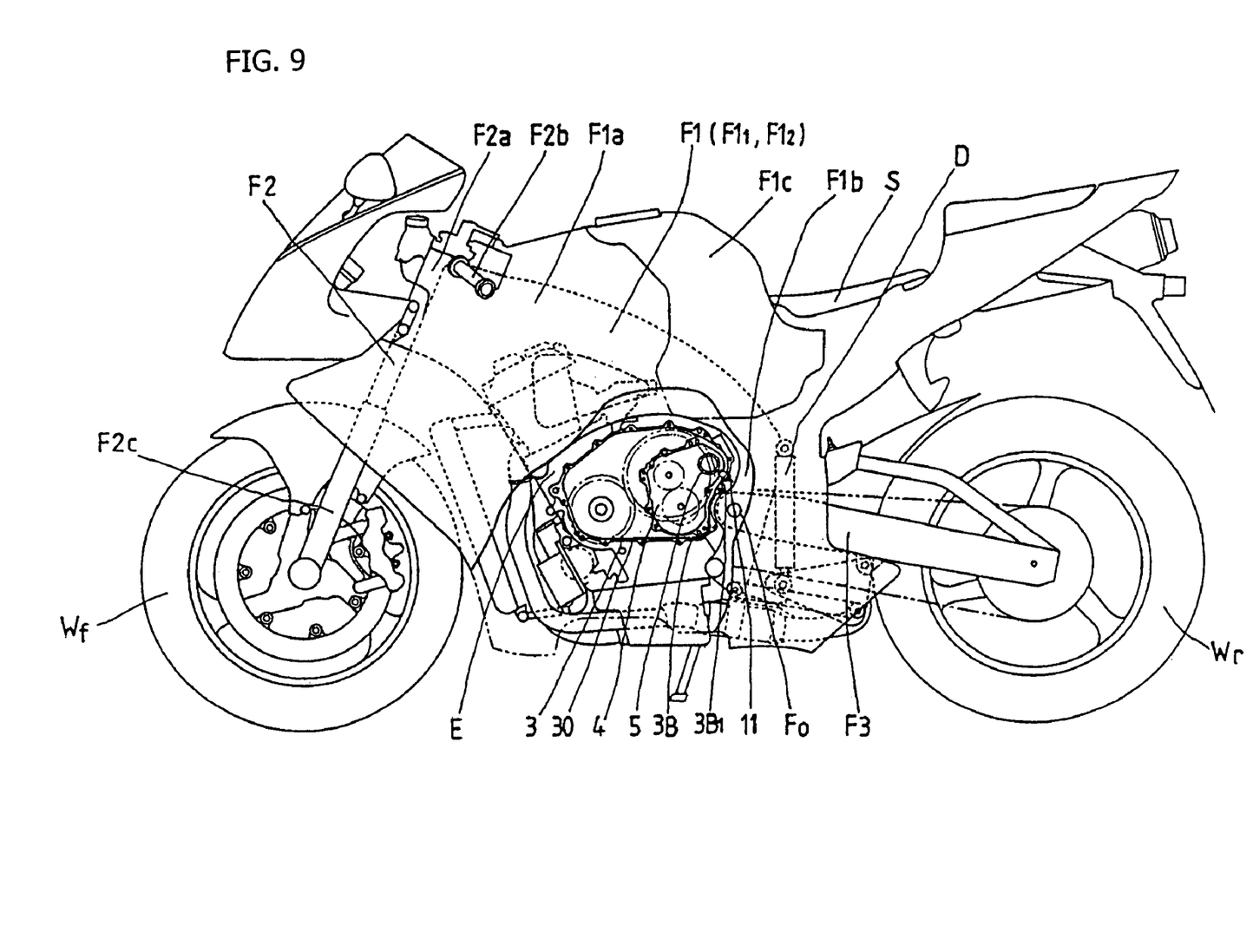
FIG. 9 is a side view showing the overall structure of a motorcycle fitted with the gear position sensor according to an embodiment of the present invention.

The motorcycle according to this embodiment has generally the following frame structure, as shown in FIG. 9. The motorcycle includes a main frame F1 composed of a pair of frames $F1_1$ and $F1_2$ of which front portions extend slightly upwards and rear portions extend while being largely bent downwards.

The main frame F1 includes an extension portion F1a extending slightly upwards, and a front end portion thereof, specifically, respective front end portions of the pair of frames constituting the main frame F1 are connected to a head pipe F2. In addition, at a slightly lower position of the bent portion F1b extending downwards of the main frame F1, a swing arm F3 is mounted which is rockably shaft-supported in the condition where its one end, or front end portion, is clamped between the pair of frames $F1_1$ and $F1_2$ constituting the main frame F1.

A steering shaft F2a is attached to the head pipe F2, a steering handle F2b is fixed to an upper portion of the steering shaft F2a, a front fork F2c is attached to a lower portion of the steering shaft F2a, and a front wheel Wf is supported on the front fork F2c. In addition, the rear wheel Wr as a drive wheel is supported between rear end portions formed by branching the other end of the swing arm F3 into two portions. In the drawing, symbol D denotes a damper, and S a seat.

A fuel tank F1c is mounted on an upper portion of the extension portion F1a extending slightly forwardly upwards of the main frame F1 consisting of the pair of frames $F1_1$ and $F1_2$, in the manner of being astride the frame F1. The internal combustion engine E is mounted in a space surrounded by a lower portion of the extension portion F1a of the main frame F1 and a downwardly bent portion F1b of the main frame F1, with its cylinder head portion directed forwardly upwards. In this mounted condition, the transmission case portion 4 of the crankcase 3 is located close to the bent portion F1b of the main frame F1.

In the transmission case portion 4 close to the downwardly bent portion F1b of the main frame F1 consisting of the pair of frames $F1_1$ and $F1_2$, the shift drum 5 is disposed at a right-side rear position of the case portion 4 in FIG. 9. The sensor 11 for exclusively detecting the neutral position in the shift drum 5 is so mounted that its rear end head portion projects downwards to the rear side of the vehicle body from the wall surface portion $3B_1$ of the lower case 3B of the crankcase 3.

As shown in Figs. 3 and 9, the position of the mounting wall surface portion $3B_1$ in the vehicle width direction is a position between the pair of frames $F1_1$ and $F1_2$ constituting the main frame F1, and is a position surrounded by the bent portion F1b of the main frame F1, a shaft support portion Fo for supporting the swing arm F3 on the main frame F1, and a rear hanger portion of the internal combustion engine E.

As shown in FIG. 2, the neutral safety switch 11 mounted to the wall surface portion $3B_1$ is located on the sheer outer side relative to the outline (indicated by dot-dash line in FIG. 2) of the clutch $4a_3$ mounted to the main shaft 4a in the side view of the internal combustion engine E. Therefore, the sensor 11 would not be hidden behind the clutch $4a_3$, and the mounted condition of the sensor 11 can be checked easily.

The characteristic constitution of the position and structure of mounting of the neutral safety switch 11, which is one of the gear position sensors, is as described above.

Since the embodiment shown in FIGS. 1 to 9 is constituted as above-described, the gear position sensor (the neutral safety switch 11) is mounted in the space defined by the main frame 1 and the swing arm F3 and the rear hanger portion of the internal combustion engine E, on the rear lower side of the lower case 3B of the upper and lower split cases of the case formed by integrating the transmission case portion 4 and the crankcase 3.

Therefore, effective use of the space is acheived, and, even where the gear position sensor (the neutral safety switch 11) is exposed and projects beyond the outside wall portion of the crankcase 3, the sensor does not constitute an obstacle, direct contact of other thing with the sensor 11 is minimized, and the sensor 11 is protected. Also, mounting of the gear position sensor in an optimum condition is achieved.

In addition, since the direction of the turning axis of the shift drum 5 and the direction of mounting the gear position sensor (the neutral safety switch 11) onto the case 3 are orthogonal to each other, the sensor 11 would not project in the vehicle width direction even where the sensor 11 is in an exposed condition. Therefore, direct contact of a foreign object with the sensor 11 is minimized, and the sensor 11 is protected.

It is straightforward to position the gear position sensor (the neutral safety switch 11) relative to the shift drum 5 in mounting the sensor 11, and it is easy to adjust the facing or contacting condition of the detection pin 11a relative to the cam surface. In addition, since it is also uncomplicated to check the mounted condition of the sensor 11, it is possible to enhance the workability in the operation of mounting the sensor, and it is comparatively simple to detach the sensor 11 at the time of maintenance, inspection or the like thereof, thus, enhancement of maintainability can also be achieved.

In addition, the position of mounting the gear position sensor (the neutral safety switch 11) onto the crankcase 3 is located at a position on the sheer outer side relative to the outline of clutch $4a_3$ attached to the main shaft 4a, in the side view of the internal combustion engine E as shown in FIG. 2. Therefore, the sensor 11 would not be hidden behind the clutch $4a_3$, so that the mounted condition of the sensor 11 can be easily checked as required, even in the condition where the clutch $4a_3$ is mounted in position.

Since the detection of the neutral position in the shift drum 5 is performed through the two gear position sensors 10 and 11 simultaneously and on the separate display portions, detection of the neutral position due to an erroneous action of the sensor is prevented from occurring, and the detection of the neutral position is performed securely. In addition, even where one of the sensors fails to function due to a damage or the like, it is possible to detect the neutral position by the other of the sensors, so that reliability of neutral position detection is enhanced.

Since the display of the detection of the neutral position by the neutral safety switch 11 is performed at such a position as to be most visible to the rider and with a clear indication, the neutral position can be checked easily and securely, so that operability in the speed change operation by stepping is largely enhanced.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having thus, described the invention, what is claimed is:

1. A gear position sensor for a transmission, said transmission comprising
   a change pedal with a shift arm,
   a shift fork,
   a shift drum,
   a main shaft operatively connected via gears of the transmission to the shift drum,
      the shift drum being positioned laterally rearward of the main shalt and having an outer circumferential surface with a plurality of lead grooves formed thereon,
   wherein
   said shift drum is capable of being turned by stepping on the change pedal to transmit force through the shift arm, and
   the gears of the transmission are capable of being changed over by moving the shift fork in a left-right direction,
   said shift fork being engaged with the lead grooves of the shift drum,
   wherein:

the gear position sensor is adapted to be mounted to the shift drum at a rear wall portion of a lower case of at least two cases which are formed by dividing, into upper and lower portions, a powertrain case formed by integrating a crankcase and a transmission case of an internal combustion engine.

2. A gear position detection system, comprising the gear position sensor of claim 1, and a neutral safety switch.

3. The gear position sensor of claim 1, wherein
said gear position sensor is mounted such that the moving direction of a detection pin thereof is orthogonal to the direction of the turning axis of said shift drum.

4. A gear position sensor for a transmission comprising
a change pedal with a shift arm,
a shift fork,
a shift drum having an outer circumferential surface with a plurality of lead grooves formed thereon, and
a rotor affixed to an end portion of the shift drum for concurrent movement therewith,
wherein
said shift drum is capable of being turned by stepping on the change pedal to transmit force through the shift arm, and
gears of the transmission are capable of being changed over by moving the shift fork in a left-right direction, said shift fork being engaged with the lead grooves of the shift drum, wherein:
the gear position sensor is adapted to be mounted to a rear wall portion of a lower case of at least two cases which are formed by dividing, into upper and lower portions, a powertrain case formed by integrating a crankcase and a transmission case of an internal combustion engine,
wherein a portion of the rotor extends radially away from a turning axis of the shift drum, and is adapted to selectively contact the gear position sensor, and
wherein said gear position sensor is disposed in a space defined between a main frame, a lower case, and a swing arm.

5. A gear position sensor for a transmission comprising
a change pedal with a shift arm, and
a shift fork, said transmission further comprising
a shift drum having an outer circumferential surface with a plurality of lead grooves formed thereon, and
a rotor affixed to an end portion of the shift drum for concurrent movement therewith,
wherein
said shift drum is turned by stepping on the change pedal to transmit force through the shift arm, and
gears of the transmission are changed over by moving the shift fork in a left-right direction, said shift fork being engaged with the lead grooves of the shift drum, wherein:
said gear position sensor is mounted such that the moving direction of a detection pin thereof is orthogonal to the direction of the turning axis of said shift drum; and
wherein a portion of the rotor extends radially away from a turning axis of the shift drum, and is adapted to selectively contact the gear position sensor.

6. A gear position detection system, comprising the gear position sensor of claim 5, and a neutral safety switch.

7. A powertrain for a vehicle comprising:
a powertrain case formed by integrating a crankcase and a transmission case,
said powertrain case being divided into an upper case portion and a lower case portion;

a gear position sensor for sensing an instant gear of a transmission; a transmission comprising
a change pedal comprising a shift arm;
a shift fork,
a main shaft supporting gears of the transmission, and;
a shift drum having an outer circumferential surface with a plurality of lead grooves formed thereon,
wherein
said shift drum is positioned laterally rearward with respect to the main shaft, and is capable of being turned by stepping on the change pedal to transmit force through the shift arm, and
gears of the transmission are capable of being changed over by moving the shift fork in a left-right direction,
said shift fork being engaged with the lead grooves of the shift drum,
and further wherein the gear position sensor is mounted to said shift drum through a rear wall portion of a lower case portion of said powertrain case.

8. A gear position sensor for a transmission comprising
a change pedal with a shift arm, and
a shift fork, and
a shift drum, said transmission further comprising:
a main shaft operatively connected via gears of the transmission to the shift drum,
the shift drum being positioned laterally rearward of the main shaft and having an outer circumferential surface with a plurality of lead grooves formed thereon,
wherein
said shift drum is capable of being turned by stepping on the change pedal to transmit force through the shift arm, and
the gears of the transmission are capable of being changed over by moving the shift fork in a left-right direction,
said shift fork being engaged with the lead grooves of the shift drum,
wherein:
the gear position sensor is adapted to be mounted to the shift drum at a rear wall portion of a lower case of at least two cases which are formed by dividing, into upper and lower portions, a case formed by integrating a crankcase and a transmission case of an internal combustion engine;
wherein
the gear position sensor comprises a main body portion with a central opening formed therein, and wherein
the gear position sensor is mounted to an end portion of the shift drum so that the end portion of the shift drum is received within the central opening.

9. The gear position sensor of claim 8, wherein the central opening is surrounded by a plurality of terminal portions, each of the terminal portions corresponding to a unique gear position.

10. The gear position sensor of claim 8, wherein
the central opening is surrounded by a plurality of terminal portions, each terminal portion corresponding to one of a plurality forward gear positions and a neutral gear position.

11. A vehicle transmission comprising
a transmission case,
a first gear position sensor for sensing an instant gear position of a transmission including a neutral gear position and a plurality of forward gear positions;
a second gear position sensor for sensing a neutral gear position, a transmission comprising
a change pedal comprising a shift arm;
a shift fork, a shift drum having an outer circumferential surface with a plurality of lead grooves formed thereon,
wherein
said shift drum is capable of turning in response to an operator stepping on the change pedal to transmit force through the shift arm;
gears of the transmission are able to be changed over by moving the shift fork in a left-right direction, said shift fork being engaged with the lead grooves of the shift drum; the first gear position sensor comprises a main body portion with a central opening formed therein; and
the fist gear position sensor is mounted to an end portion of the shift drum so that the end portion of the shift drum is received within the central opening.

12. A gear position sensor for a motorcycle transmission, the motorcycle comprising
a main frame,
a power train case configured and adapted to be mounted transversely on the main frame, and
a swing arm having one end rotatably supported on the main frame so as to extend rearward of the power train case, wherein the transmission comprises
a change pedal with a shift arm,
a shift drum having an outer circumferential surface with a plurality of lead grooves formed thereon,
a shift fork operated by the change pedal and engaged with the lead grooves provided in the outer circumferential surface of the shift drum, and
gears engaged with the shift fork,
wherein
said shift drum is turned by stepping on the change pedal to transmit force through the shift arm, and
the gears of the transmission are changed over by moving the shift fork in a left-right direction,
said shift fork being engaged with the lead grooves of the shift drum, and
wherein
said gear position sensor is disposed in a space defined between the main frame, a rear wall portion of the power traincase, and the swing arm.

13. The gear position sensor of claim 12, wherein said gear position sensor is mounted such tat the moving direction of a detection pin thereof is orthogonal to the direction of the turning axis of said shift drum.

14. The gear position sensor of claim 12, wherein said gear position sensor is a neutral safety switch.

15. The gear position sensor of claim 1, wherein said internal combustion engine is adapted to be mounted transversely on a vehicle frame.

* * * * *